United States Patent Office 3,430,797
Patented Mar. 4, 1969

3,430,797
ORIENTED THERMOPLASTIC CONTAINER CLOSURES
Robert R. Goins, Bartlesville, Okla., assignor to Phillips Petroleum Company, a corporation of Delaware
Filed June 17, 1966, Ser. No. 558,468
U.S. Cl. 215—41   9 Claims
Int. Cl. B65d 41/16, 41/48; B29c 3/00

ABSTRACT OF THE DISCLOSURE

A thermoplastic container closure comprising a top portion and a depending skirt portion, both portions being formed of completely oriented material, is formed by compression molding of a thermoplastic preform in a closed mold at orientation temperature.

---

Figure 1:
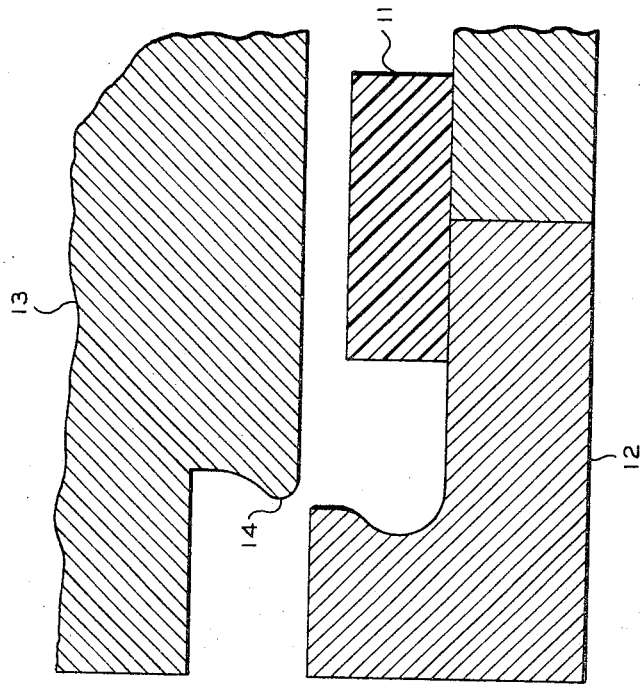

This invention relates to a container closures and a method for making them. In one aspect, it relates to container closures completely made from oriented thermoplastic material. In another aspect, it relates to a method of making a completely oriented container closure by pressing a plastic preform into closure shape at orientation temperatures. In another aspect, it relates to oriented polyolefin bottle closures having a top and depending skirt portion. In still another aspect, it relates to a polyproylene bottle cap having a low brittle temperature by virtue of its biaxial orientation.

Various thermoplastic materials have been used as container closures. Bottle caps, for example, have been made from polyethylene, polypropylene, nylon, vinylidenechloride, and polyethylene terephthalate, as well as other thermoplastic materials. Such plastic materials are tough, have a high tensile strength, as well as high impact strength, high bursting strength, high tear strength, and good resistance to abrasion. Additionally, these materials have low gas and moisture vapor transmission properties so that it is possible to maintain carbonated beverages, for example, with their initial high state of carbonation, so that they will not ultimately become flat and unsalable, and furthermore will not pick up odors and flavors of other foods during storage in a refrigerator.

One of the problems which has been encountered in the production of bottle caps of such thermoplastic materials, however, is that certain of these materials become brittle at refrigeration temperatures. This has been particularly noticeable with polypropylene bottle caps which begin to embrittle at a temperature of about 40 to 70° F. If, however, the thermoplastic material is biaxially oriented, the temperature at which embrittlement occurs is lowered considerably. Biaxially oriented polypropylene, for example, will not become appreciably embrittled down to a temperature below 0° F. Therefore, a completely oriented container closure would be very desirable for use in refrigerated or frozen package goods.

It is, therefore, an object of my invention to produce a thermoplastic container closure of reduced brittle temperature. It is another object of this invention to produce a polyolefin bottle cap which is completely formed of oriented material. It is yet another object of this invention to provide a polypropylene closure for a container which does not become brittle at refrigerator or freezer storage temperatures. It is a further object of the invention to mold a bottle cap in such a way that no trimming of the cap its necessary.

Other aspects, objects and the several advantages of this invention are apparent to one skilled in the art from a study of this disclosure, drawings, and the appended claims.

According to my invention, I form a completely oriented container closure of thermoplastic material by pressing a preform of the material into closure shape under orientation temperature conditions. Because the closure is biaxially oriented throughout its entire mass due to working of the plastic during pressing, it will retain its flexibility at temperatures where unoriented closures would be quite brittle.

Figure 2:
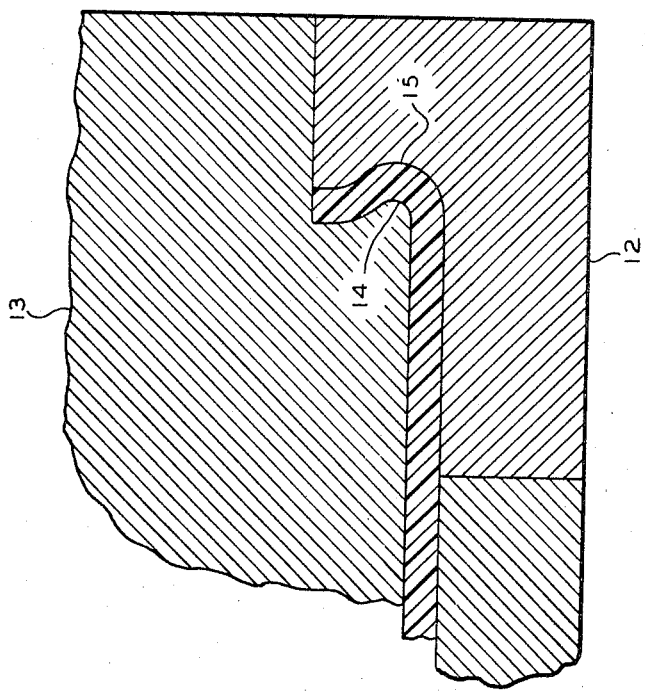

The operation of my invention can be seen by reference to the drawings. FIGURE 1 shows a preform ready to be pressed into the closure forming mold. FIGURE 2 shows the formed closure member.

A preformed disk of thermoplastic material 11 is placed in partable mold 12 at a temperature which is suitable for orientation of the particular thermoplastic being used. Plunger 13 equipped with head 14 is lowered into the mold, and exerts sufficient pressure upon the thermoplastic preform to form the plastic material into the finished closure. When head 14 has been lowered into the mold by plunger 13, and the two halves of mold 12 closed, a mold area of the desired wall thickness is formed in cooperation with the undercut walls of mold 12. The mold is shown in closed position in FIGURE 2, where the pressing operation has been completed, and the finished bottle cap formed. As soon as the pressing is complete, mold 12 is parted and plunger 13 withdrawn so that finished bottle cap 15 may be removed from head 14. Although head 14 is shown as being rigid in this embodiment, it is within the scope of this invention to substitute an expansible head.

By this pressing action, which is conducted at a temperature suitable for orientation of the particular thermoplastic material being used, the entire plastic mass of the container closure is worked, and thus oriented. It will thus be seen that the closure of my invention is much superior to closures formed by means of a plug mold wherein orientation of the skirt may take place, but the top portion, however, will not be oriened. This means that the top can become brittle at low temperatures, and is the weak point of the closure. In contrast, my closure is oriented throughout and thus has no unoriented areas of potential embrittlement.

Any orientable thermoplastic material is suitable for use in the process of my invention. Polyvinylidene chloride, nylon, polyethylene glycol terephthalate, and the like, are suitable. The currently preferred polymers, however, are the highly crystalline olefin polymers such as polyethylene, polypropylene, poly-1-butene, poly-4-methylpentene-1, and other homopolymers and copolymers of similar mono-1-olefins having up to 8 carbon atoms per molecule.

The preform will generally be circular, and can be prepared by molding, stamping from a sheet, or cutting from a rod of the thermoplastic. The actual dimensions of the preform will be determined by experimentation with the particular mold configuration, and the total volume of the preform will be just sufficient to fill the closed mold.

The particular temperature at which the pressing of the thermoplastic preform takes place will depend upon the particular characteristics of the thermoplastic material being treated. A temperature range will be chosen so that the maximum orientation will occur during the physical working of the plastic material during pressing. For polypropylene, for example, a temperature in the range of 295° F. to 340° F. has been found suitable. The preform can be heated before being placed in the mold, or the mold itself can be provided with a heating means whereby the preform will be heated in the mold prior to pressing. In any event, both members of the mold will be heated to the proper orientation temperature for the particular thermoplastic material being used. In general, the mold will be held at a temperature somewhat below the temperature of the plastic material being formed. It ordinarily will be found desirable to quench the cap at a reduced temperature prior to removing it from the mold in order to prevent shrinkage of the cap.

Temperatures which are above the orientation range will cause the plastic structure to become amorphous. At such temperatures working of the plastic will not cause orientation. On the other hand, temperatures which are too low will make it impossible to form the cap completely because the plastic will rupture before filling the mold cavity. The optimum temperature for orientation is the highest temperature which can be achieved while the resin mass is still in a substantially crystalline condition. This temperature will vary depending upon the polymer used and its crystalline melting point, and is generally in the range of 5 to 25° F. below the melting point of the polymer. Preferred temperature ranges for pressing are:

| Polymer | Melting point, °F. | Pressing temperature, preferred range, °F. |
|---|---|---|
| High density polyethylene | 275 | 250–270 |
| Polypropylene | 340 | 315–340 |
| Polystyrene | 445 | 420–440 |
| Nylon 6-6 | 490 | 465–485 |
| Nylon 6 | 420 | 395–415 |

*Example I*

A series of specimens were formed by pressing a ⅜-inch diameter, 160-mil thick specimen at varying pressures. The specimen and the mold were warmed to 334° F. for 1½ minutes under no pressure. At the end of the warm-up period, the press was closed for a period of 30 seconds. The assembly was then taken from the press and quenched in a water bath at 60° F. The table below shows the thickness of the finished cap material as a function of ram force.

| Pressure (tons of ram force) | Film thickness (inches) |
|---|---|
| 10 | .008 |
| 8 | .0085 |
| 5 | .010 |
| 5 | .010 |
| 5 | .0095 |
| 3 | .0170 |

*Example II*

Specimens formed by the method of Example I were subjected to the Masland Cold Crack test (ASTM D1790–62). For comparison, specimens were molded under the conditions described in Example I, except that they were warmed to a temperature of 428° F. for a period of 3 minutes, simulating normal molding conditions. Results of the Cold Crack test on the specimens formed at the lower temperature in accordance with my invention and those formed at the higher temperature are shown in the table below:

| Temp., °F. | Film from method I, percent failure | Film from method II, percent failure |
|---|---|---|
| −10 | 50 | 100 |
| 0 | 0 | 100 |
| +10 | 0 | 100 |
| +20 | 0 | 100 |

This example shows that caps formed by the process of my invention have a brittleness temperature between −10° and 0° F., whereas caps formed in normal molding temperatures have a brittleness somewhat in excess of +20° F.

My invention, therefore, makes possible for the first time the practical use of polypropylene bottle caps under refrigeration or in cold weather, particularly where the caps may be subjected to impact, as in the stacking of soft drink cases.

Reasonable variation and modification are possible within the scope of the foregoing disclosure and the drawing to the invention, the essence of which is that a molded thermoplastic container closure is formed completely of oriented thermoplastic material by pressing the thermoplastic into closure shape at a temperature within the orientation range.

I claim:
1. A finished integral pressed oriented structurally stable thermoplastic container closure consisting of a top portion and an integral depending skirt portion, both of said portions consisting of oriented thermoplastic material.
2. The closure of container in claim 1 wherein said thermoplastic material is a polyolefin.
3. The closure of claim 1 wherein said thermoplastic material is polypropylene.
4. The closure of claim 1 wherein said container is a bottle.
5. The closure of claim 1 wherein said closure comprises a top and a depending skirt adapted to encircle a container opening.
6. A method of forming a finished integral oriented structurally stable thermoplastic container closure comprising pressing a preform of said thermoplastic in a closed mold at orientation temperature and forcing said thermoplastic to flow within said closed mold and conform to the interior configuration of said mold defining said integral closure and orienting substantially the entire mass of said thermoplastic in said mold under the influence of said flow.
7. The method of claim 6 wherein said thermoplastic material is a polyolefin.
8. The method of claim 6 wherein said thermoplastic material is polypropylene and said pressing takes place at a temperature of 295° F. to 340° F.
9. The method of claim 6 wherein the volume of said preform is just sufficient to fill said mold when closed.

References Cited

UNITED STATES PATENTS

| 2,885,105 | 5/1959 | Heyl et al. | 215—41 X |
| 2,961,711 | 11/1960 | Diedrich et al. | 18—48 |
| 3,184,524 | 5/1965 | Whiteford | 264—97 X |
| 3,235,111 | 2/1966 | Whitton et al. | 215—41 X |
| 2,781,552 | 2/1957 | Gray. | |
| 2,881,480 | 4/1959 | Waters. | |
| 3,243,211 | 3/1966 | Wetmore | 215—38 |
| 3,344,912 | 10/1967 | Sternau | 206—46 |

FOREIGN PATENTS

| 1,183,032 | 1/1959 | France. |
| 1,354,584 | 1/1964 | France. |

WILLIAM T. DIXSON, JR., *Primary Examiner.*

U.S. Cl. X.R.

264—325